United States Patent
Tsirkin (10) Patent No.: US 9,727,359 B2
(45) Date of Patent: Aug. 8, 2017

(54) VIRTUAL MACHINE FUNCTION BASED SUB-PAGE BASE ADDRESS REGISTER ACCESS FOR PERIPHERAL COMPONENT INTERCONNECT DEVICE ASSIGNMENT

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 274 days.

(21) Appl. No.: 14/697,102

(22) Filed: Apr. 27, 2015

(65) Prior Publication Data

US 2016/0314009 A1    Oct. 27, 2016

(51) Int. Cl.
G06F 9/455    (2006.01)

(52) U.S. Cl.
CPC ...... G06F 9/45545 (2013.01); G06F 9/45558 (2013.01); *G06F 2009/45583* (2013.01)

(58) Field of Classification Search
CPC ............. G06F 9/45545; G06F 9/45558; G06F 2009/45583
USPC .......................................................... 718/1
See application file for complete search history.

(56) References Cited

U.S. PATENT DOCUMENTS

| | | | |
|---|---|---|---|
| 6,832,278 B2 | 12/2004 | Oshins et al. | |
| 7,853,744 B2 | 12/2010 | Mahalingam et al. | |
| 7,945,436 B2 | 5/2011 | Ang et al. | |
| 8,527,673 B2 | 9/2013 | Mahalingam et al. | |
| 8,645,594 B2 | 2/2014 | Foong et al. | |
| 8,656,482 B1 | 2/2014 | Tosa et al. | |
| 8,856,781 B2 | 10/2014 | Cowperthwaite et al. | |
| 2006/0026383 A1* | 2/2006 | Dinechin ............... | G06F 12/109 711/207 |
| 2006/0224816 A1* | 10/2006 | Yamada ................. | G06F 12/109 711/6 |
| 2007/0220231 A1* | 9/2007 | Sakthivelu ........... | G06F 12/1009 711/203 |
| 2008/0072223 A1* | 3/2008 | Cowperthwaite ..... | G06F 9/4403 718/1 |

(Continued)

OTHER PUBLICATIONS

Motakis et al., "Platform Device Assignment to KVM-on-ARM Virtual Machines via VFIO," 2014 International Conference on Embedded and Ubiquitous Computing, 2014, IEEE, pp. 170-177.*

(Continued)

*Primary Examiner* — Wei Zhen
*Assistant Examiner* — Andrew M Lyons
(74) *Attorney, Agent, or Firm* — K&L Gates LLP (57) ABSTRACT

A value stored in a guest device register is received from a virtual machine. A hypervisor generates a page table including a first mapping between the value stored in the guest device register and a first address of the host operating system and a second mapping between a second address of the guest operating system and a third address of a virtual machine function on the host operating system. The hypervisor modifies a first access status of the first mapping to include rendering memory of the host device referenced by the value stored in the guest device register accessible to the virtual machine function, and a second access status of the second mapping to include rendering the virtual machine function accessible to the virtual machine. The hypervisor initializes code on the virtual machine function to access the memory of the host device.

20 Claims, 5 Drawing Sheets

(56) References Cited

U.S. PATENT DOCUMENTS

| | | | | |
|---|---|---|---|---|
| 2008/0294808 | A1* | 11/2008 | Mahalingam | G06F 13/105 710/26 |
| 2008/0307213 | A1* | 12/2008 | Sekiguchi | G06F 9/45558 713/1 |
| 2009/0037936 | A1* | 2/2009 | Serebrin | G06F 12/0292 719/318 |
| 2009/0172330 | A1* | 7/2009 | Dewan | G06F 12/145 711/163 |
| 2009/0187729 | A1* | 7/2009 | Serebrin | G06F 9/455 711/206 |
| 2010/0088431 | A1* | 4/2010 | Oshins | G06F 9/468 710/10 |
| 2011/0154318 | A1* | 6/2011 | Oshins | G06F 9/45537 718/1 |
| 2011/0321158 | A1* | 12/2011 | Craddock | G06F 9/45558 726/20 |
| 2012/0072619 | A1* | 3/2012 | Tsirkin | G06F 9/45558 710/26 |
| 2012/0072906 | A1* | 3/2012 | Tsirkin | G06F 12/1009 718/1 |
| 2012/0144071 | A1* | 6/2012 | Oshins | G06F 9/468 710/8 |
| 2013/0091318 | A1* | 4/2013 | Bhattacharjee | G06F 12/1475 711/6 |
| 2014/0059320 | A1* | 2/2014 | Bennett | G06F 12/1009 711/206 |
| 2014/0122828 | A1* | 5/2014 | Kagan | G06F 12/1081 711/206 |
| 2014/0181808 | A1* | 6/2014 | Sahota | G06F 9/45545 718/1 |
| 2014/0189690 | A1 | 7/2014 | Ramakrishnan | |
| 2014/0380009 | A1* | 12/2014 | Lemay | G06F 12/145 711/163 |
| 2016/0048464 | A1* | 2/2016 | Nakajima | G06F 12/1475 711/152 |
| 2016/0077884 | A1* | 3/2016 | Hunter | G06F 9/5077 718/104 |
| 2016/0147551 | A1* | 5/2016 | Tsirkin | G06F 9/45558 718/1 |
| 2016/0210259 | A1* | 7/2016 | Tsirkin | G06F 13/4045 |
| 2016/0306645 | A1* | 10/2016 | Serebrin | G06F 9/45558 |
| 2016/0314089 | A1* | 10/2016 | Apfelbaum | G06F 13/4027 |

OTHER PUBLICATIONS

Willmann et al., "Protection Strategies for Direct Access to Virtualized I/O Devices," ACT'08 USENIX 2008 Annual Technical Conference, 2008, USENIX, pp. 15-28.*

Graf; [Patch] Inform users about busy device assignment attempt; kvm@vger.kernel.org (16 pages).

Wright; KVM: PCI device assignment; Red Hat, Inc. Aug. 10, 2010 (23 pages).

Williamson; KVM Development List; Sep. 28, 2012; Re: vga passthrough//questions about pci passthrough (2 pages).

What's New in VMware vSphere 4: Virtual Networking; White Paper; vmware (8 pages).

* cited by examiner

FIG. 1

| Extended Page Table 182 | | | |
|---|---|---|---|
| Page Entry 200A | 210A x0001 | 220A Present | 230A Read-Write | 240A Address of the Memory of the Device Unallocated Memory x01AF |
| Page Entry 200B | 210B x0002 | 220B Present | 230B Executable Only | 240B VM Function Address x01FF |
| Page Entry 200C | 210C x0003 | 220C Non-present | 230C Executable | 240C VM Function Address x024F |
| Page Entry 200D | 210D x0004 | 220D Non-present | 230D Read Only | 240D VM Function Address x029F |

VIRTUAL MACHINE FUNCTION BASED SUB-PAGE BASE ADDRESS REGISTER ACCESS FOR PERIPHERAL COMPONENT INTERCONNECT DEVICE ASSIGNMENT

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system, methods and apparatus for virtual machine function based sub-page base address register access for peripheral component interconnect device assignment. A system comprises a memory, a device, one or more processors, in communication with the memory, one or more virtual machines executing on the one or more processors, and a hypervisor executing on the one or more processors. A value stored in a guest device register is received from a virtual machine. A hypervisor generates a page table including a first mapping between the value stored in the guest device register and a first address of the host operating system and a second mapping between a second address of the guest operating system and a third address of a virtual machine function on the host operating system. The hypervisor modifies a first access status of the first mapping to include rendering memory of the host device referenced by the value stored in the guest device register accessible to the virtual machine function, and a second access status of the second mapping to include rendering the virtual machine function accessible to the virtual machine. The hypervisor initializes code on the virtual machine function to access the memory of the host device using the virtual machine function.

Additional features and advantages of the disclosed method and apparatus are described in, and will be apparent from, the following Detailed Description and the Figures.

DETAILED DESCRIPTION OF EXAMPLE EMBODIMENTS

Figure 1:
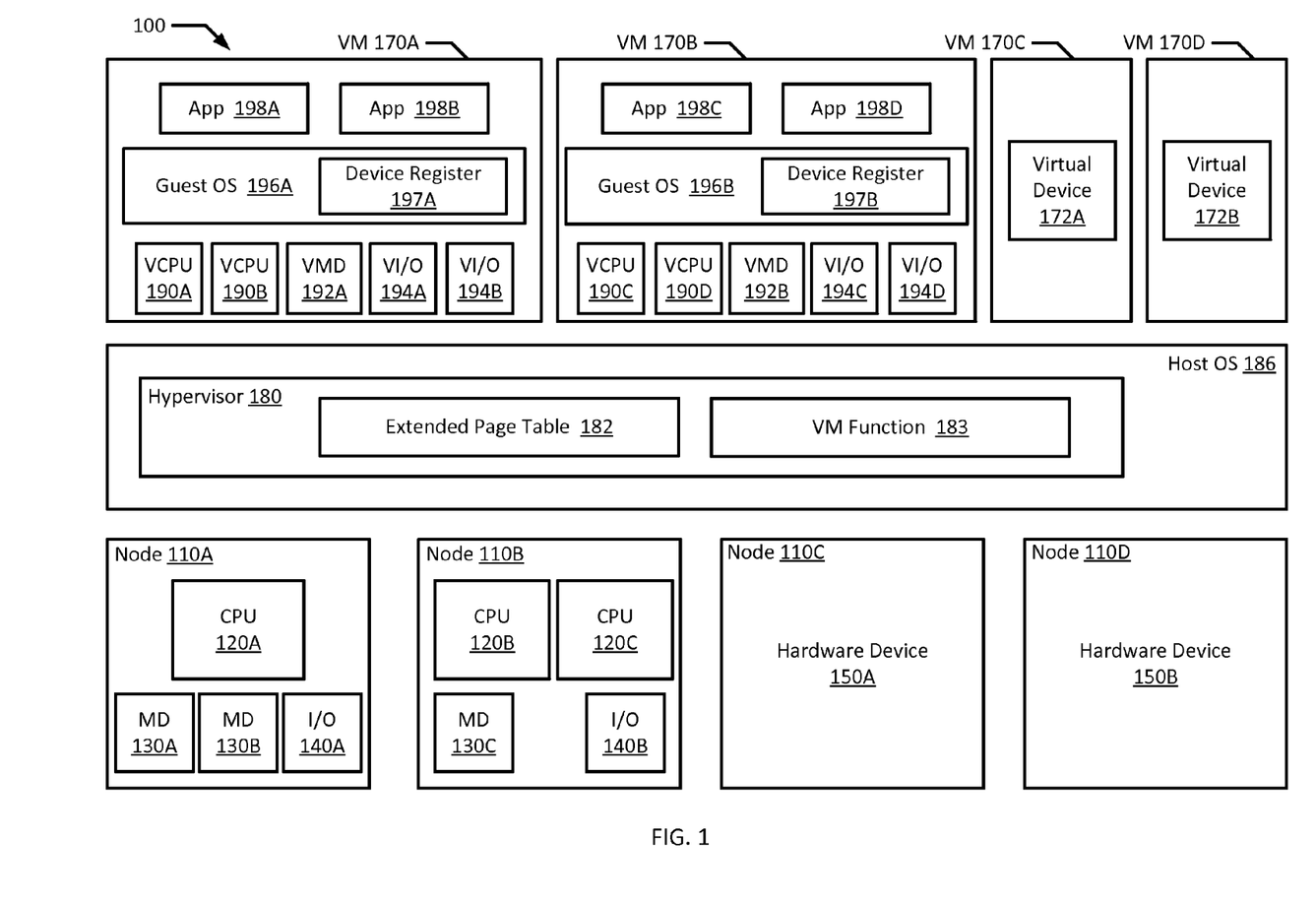
FIG. 1 is a block diagram of an example multiprocessor computer system according to an example embodiment of the present disclosure.

FIG. 1 depicts a high-level component diagram of an example multiprocessor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-D), by executing a software layer (e.g., hypervisor 180) above the hardware and below the virtual machines 170A-D, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-D as devices, including virtual processors (e.g., VCPU 190A-D), virtual memory devices (e.g., VMD 192A-B), and/or virtual I/O devices (e.g., VI/O 194A-D).

In an example embodiment, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. The virtual machine 170A-B may include a device register 197A-B. As used herein, a device register 197A-B refers to a configuration space of a device. In an example embodiment, a device may be a device (e.g., VCPU 190A-D, VMD 192A-B, VI/O devices 194A-D, virtual device 172A-B, etc.) of a guest operating system 196A-B (that is, a "guest device"). In an example embodiment, the device register 197A-B is a guest device register. In an example embodiment, a device register 197A-B may be a command register or a base address register (BAR). In an example embodiment, a device register 197A-B may include any known register used in the peripheral component interconnect (PCI) configuration space. In an example embodiment, a base address register (BAR) includes a base (or start) address of the guest device at which a memory region (e.g., within page 310A) of the host device (which corresponds to the guest device) can be accessed and further includes a size indicator which denotes the size of the memory region of the host device.

In an example embodiment, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D.

In another example embodiment, a virtual machine 170C-D may include virtual devices 172A-B. A virtual device 172A-B may provide the functionality of traditional hardware devices such as network devices, PCI devices, storage devices, sound or video adaptors, photo/video cameras, printer devices, keyboards, displays, etc.

In an example embodiment, the hypervisor 180 may provide one or more virtual machine functions (VM Functions) 183 to a virtual machine 170A-D. The code that a VM Function 183 runs on the physical processor(s) 120A-C may utilize the resources of host operating system (Host OS) 186, such as the memory devices 130A-C, and the input/output devices 140A-B as well as the resources of one or more of the virtual machines 170A-D including the virtual processors 190A-D, the virtual memory 192A-B, and the virtual I/O devices 194A-D. For example, the VM Function 183 may be called by a VM 170A to transfer data to, or access the resources of the Host OS 186 or another VM 170B. By contrast, each VM 170A may be limited to the use of its own resources including its VCPUs 190A-B, virtual memory 192A, and virtual I/O devices 194A-B unless it invokes a VM Function 183 as described below.

In an example embodiment, the VM Function 183 may be invoked for a VM 170A, by the guest OS 196A that is running on the VM 170A. In an example embodiment, a VM Function 183 may only be invoked if hypervisor 180 provides access or grants a request. For example, a VM 170A or guest OS 196A may invoke a VM Function 183 to handle a task more efficiently or using greater resources than are presently available to the VM 170A or guest OS 196A. In an example embodiment, a hypervisor 180 may grant a VM 170A or guest OS 196A access to a VM Function 183 to allow the VM 170A or guest OS 196A to access a resource without requiring an exit to the hypervisor. In an example embodiment, the hypervisor 180 may also deny the request by causing an undefined opcode exception or a general protection fault exception whenever the VM Function 183 is invoked.

The hypervisor may also include one or more extended page tables 182. Example embodiments of these data structures are described in greater detail below and as shown in FIG. 2.

Figure 2:
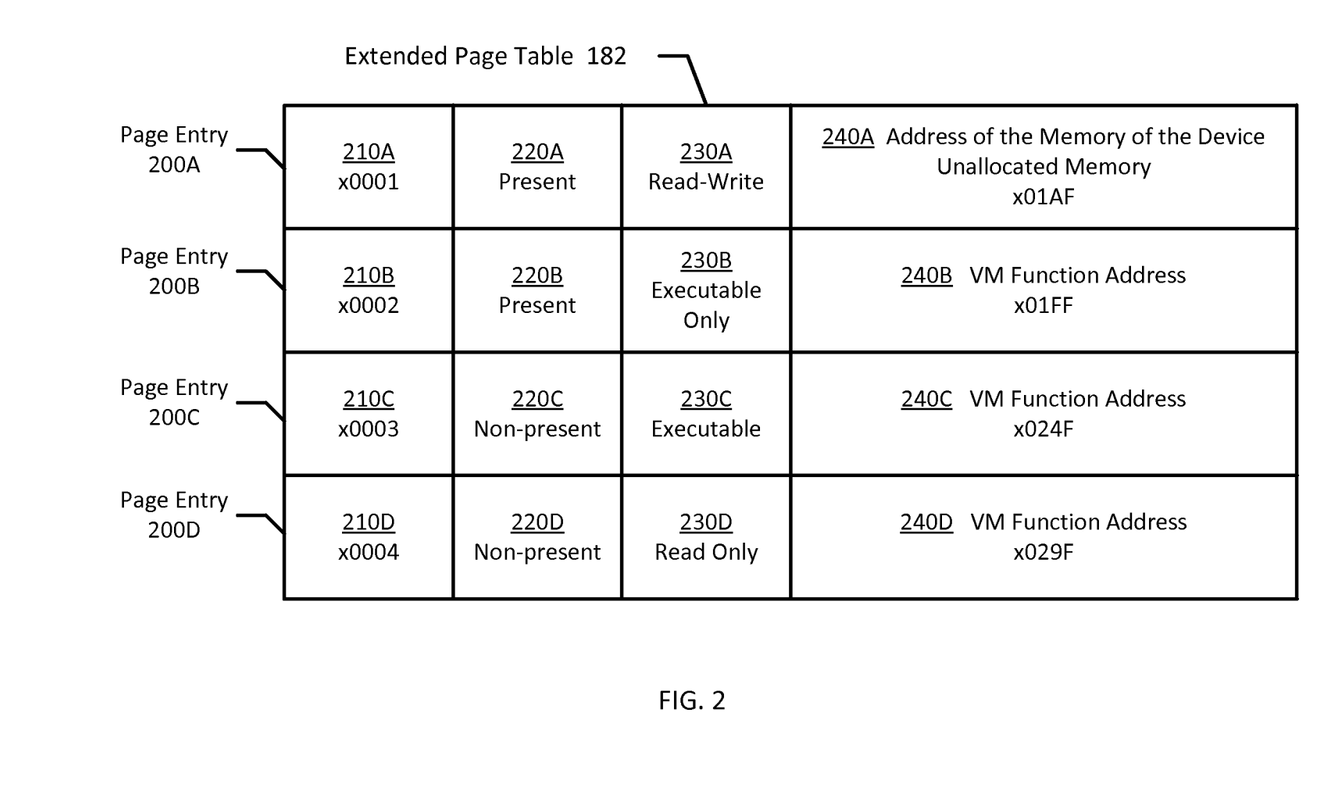
FIG. 2 a block diagram of an example extended page table according to an example embodiment of the present disclosure.
Figure 3:
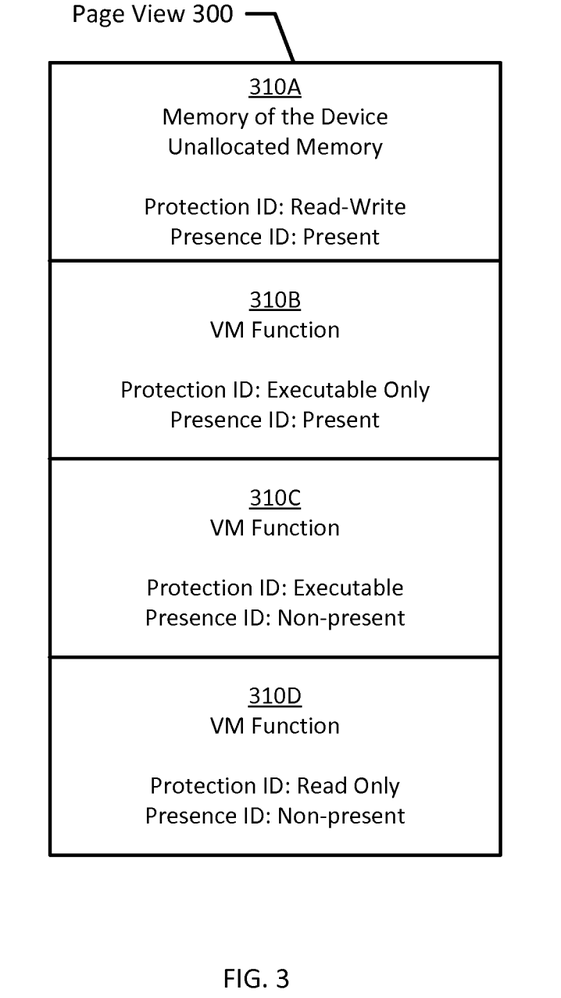
FIG. 3 is a block diagram of example page views and pages according to an example embodiment of the present disclosure.

FIG. 2 illustrates an extended page table (otherwise referred to as a page table) 182 according to an example embodiment of the present disclosure. In general, the hypervisor 180 manages the memory usage of the VMs 170A-D. Both virtual memory and physical memory may be divided into pages 310A-D which are identified with a unique number (e.g., Page Frame Number (PFN) 210A-D). Example embodiments of pages 310A-D and page views 300 are described in greater detail below and as shown in FIG. 3.

A page table 182 is a data structure used by the hypervisor 180 to store a mapping of addresses of the guest OS 196A-B to addresses of the host OS 186 (e.g., physical resources of the computer system 100). Accordingly, address translation is handled using page tables 182. For example, the guest OS 196A-B operating within the VMs 170A-D may be given the impression that there is a contiguous section of guest memory available, when in reality, the available guest memory may be spread across various memory devices 130A-C.

The extended page table 182 comprises page entries 200A-D that map PFN 210A-D (e.g., an address of the guest OS 196A-B) with an address 240A-D (e.g., an address of the host OS 186). Page tables 182 may be used together with any paging data structure used by the VMs 170A-D to support translation from guest OS 196A-B to host OS 186 addresses (e.g., 32-bit linear address space using a two-level hierarchical paging structure, Physical Address Extension mode, INTEL Extended Memory 64 Technology mode, etc.). In an example embodiment, page tables 182 may include presence identifiers 220A-D and protection identifiers 230A-D that indicate an access status for each of the pages 310A-D.

In an example embodiment, page tables 182 may include a presence identifier 220A-D. The presence identifier 220A-D indicates an access status of a page 310A-D corresponding to the page entry 200A-D of the page table 182. For example, a presence identifier 220A-D may used to define that a given page 310A-D is present (or accessible) or non-present (or inaccessible). For example, as illustrated in the example embodiment in FIG. 2, the page 310A corresponding to page entry 200A, PFN 210A address (x0001), address 340A (x01AF), and presence identifier 220A has been defined in page table 182 as 'Present'. The hypervisor 180 may be used to modify a presence identifier 220A-D of pages 310A-D.

In an example embodiment, page tables 182 may include a protection identifier 230A-D. The protection identifier 230A-D indicates the access status of a page 310A-D corresponding to the page entry 200A-D of the page table 182. For example, a protection identifier 230A-D may used to define that a given page 310A-D is writable (or read-write), write-protected (or read-only), executable (or executable and readable), executable only, etc. For example, as illustrated in the example embodiment in FIG. 2, the page 310A corresponding to page entry 200A, PFN 210A address (x0001), address 340A (x01AF), and protection identifier 230A has been defined in page table 182 as 'Read-Write'. The hypervisor 180 may be used to modify a protection identifier 230A-D of pages 310A-D. In addition, in an example embodiment, the page table 182 may include additional information not shown in FIG. 2 including statistics information, background information, dirty identifiers which indicate that modifications to a page must be written back to disk, etc.

In an example embodiment, one or more page tables 182 may be maintained by the hypervisor 180 which map guest OS 196A-B addresses to host OS 186 addresses that are accessible by the hypervisor 180, VMs 170, guest OS 196A-B, Host OS 186, Host OS 186 resources, and/or VM Functions 183. The sizes of different page tables may vary and may include more or fewer entries than are illustrated in FIG. 2.

FIG. 3 illustrates page view 300 and pages 310A-D in accordance with an example embodiment of the present disclosure. As noted above, a page 310A-D may be a portion of physical or virtual memory designated for storing data. As used herein, a page view 300 denotes a mapping from addresses designated for use by VM 170A-D to host OS 186 addresses. In an example embodiment, the page view 300 may denote the mapping from PFNs of a VM 170A-D to host OS 186 addresses, as used during normal execution of the VM 170A-D. As illustrated in FIG. 3, pages 310A-D may be defined by presence identifiers such as 'Non-present' and protection identifiers such as 'Read-Only' in accordance with their respective page table 182 presence identifiers (e.g., 220D) and protection identifiers (e.g., 230D).

Figure 4:
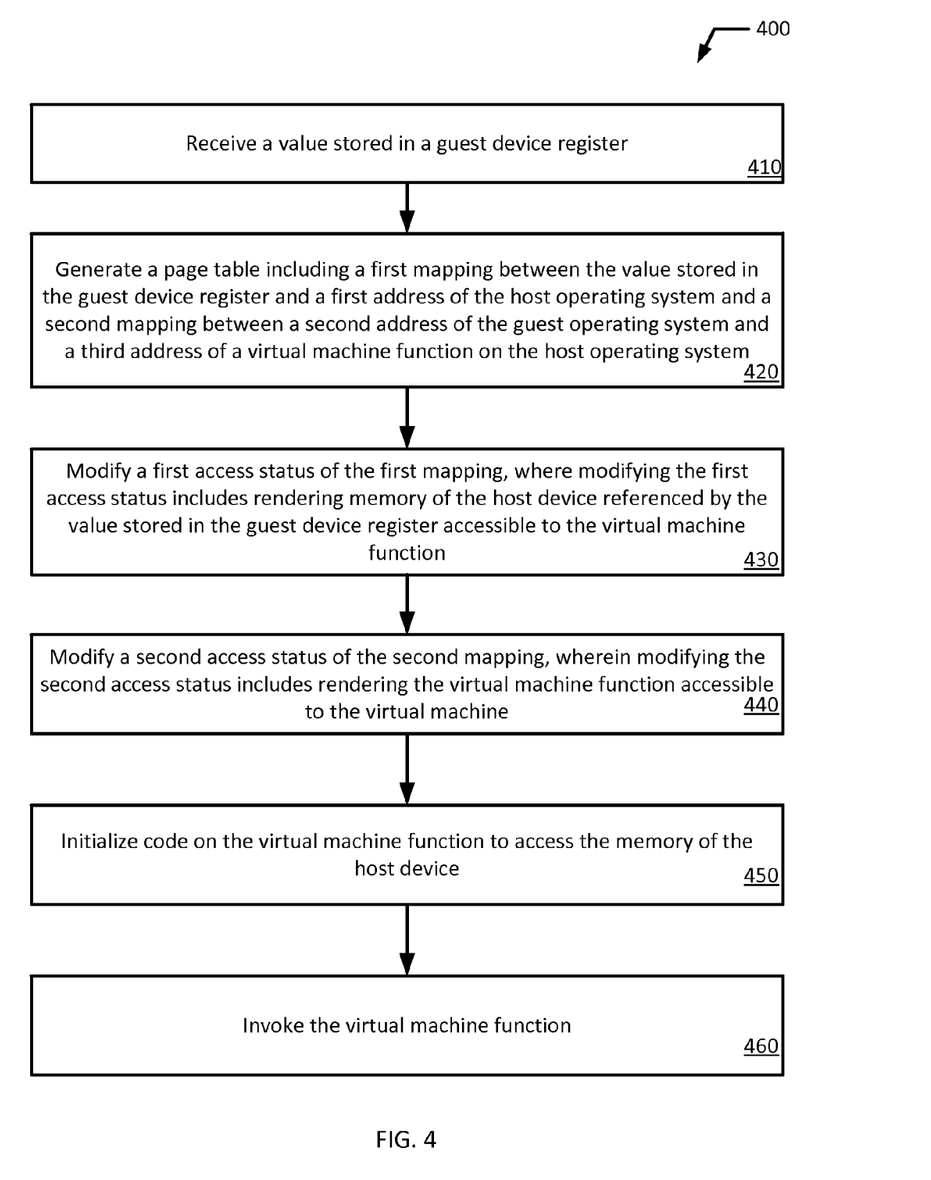
FIG. 4 is a flowchart illustrating an example process for virtual machine function based sub-page base address register access for peripheral component interconnect device assignment according to an example embodiment of the present disclosure.

FIG. 4 illustrates a flowchart of an example method 400 for virtual machine function based sub-page base address register access for peripheral component interconnect device assignment. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method is performed by a hypervisor 180.

The example method 400 starts and a value stored in a guest device register 197A is received from a virtual machine 170A (block 410). In an example embodiment, the value stored in the guest device register 197A may be a base address of the guest device corresponding to memory (e.g., within page 310A) of the host device corresponding to the guest device can be accessed. In an example embodiment, the size of the memory (e.g., within page 310A) of the device (e.g., device of the host OS 186 and the corresponding device of the guest OS 196A-B) may be less than a page size defined by the computer system 100. In this manner, the memory (e.g., within page 310A) of the host device may occupy a portion of a page 310A that is less than the whole page 310A. For example, the page size of a computer system may be defined to be 4 KiB (kilobytes) and the memory (e.g., within page 310A) of the device may occupy 2 KiB (kilobytes). In an example embodiment, the portion of a page 310A that is not occupied by the host device memory may be unallocated memory (e.g., within page 310A). In another example embodiment, the portion of a page 310A that is not occupied by the host device memory may be occupied by other data.

Responsive to receiving the value stored in the guest device register 197A, the hypervisor 180 generates a page table 182 including a first mapping between the value stored in the guest device register 197A (e.g., 210A) and a first address (e.g., 240A) of the host operating system 186 and a second mapping between a second address (e.g., 210B) of the guest operating system 196A and a third address (e.g., 240B) of a virtual machine function 183 on the host operating system 186 (block 420). In an example embodiment, the second mapping may occur prior to receiving the value stored in the guest device register 197A. In an example embodiment, more than one page entry (e.g., 200A-D) may be used for the second mapping. In an example embodiment, where the memory (e.g., within page 310A) of the device is less than a page size defined by the computer system 100, generating the first mapping between the value stored in the guest device register 197A and the first address (e.g., 240A) of the host operating system 186 may be responsive to first rounding down the value stored in the guest device register 197A to a page alignment and rounding down the first address (e.g., 240A) of the host operating system 186 to a page alignment.

The hypervisor 180 then modifies a first access status (e.g., presence identifier 220A and/or protection identifier 230A) of the first mapping, where modifying the first access status (e.g., presence identifier 220A and/or protection identifier 230A) includes rendering memory (e.g., within page 310A) of the host device referenced by the value stored in the guest device register 197A accessible to the virtual machine function 183 (block 430). In an example embodiment, rather than modifying the page table 182 with the first mapping and second mapping, the hypervisor 180 may initialize the page table 182 to include the first mapping and second mapping. In an example embodiment, modifying the first access status (e.g., presence identifier 220A and/or protection identifier 230A) may include marking a presence identifier 220A of the first page entry 200A 'Present'. In this manner, the memory (e.g., within page 310A) of the host device may be made present in the memory of the virtual machine function 183. In an example embodiment, modifying the first access status (e.g., presence identifier 220A and/or protection identifier 230A) may include marking a protection identifier 230A of the first page entry 200A 'Read-Write'. In this manner, the virtual machine function 183 may be given the ability to read and write to the memory (e.g., within page 310A) of the host device.

The hypervisor 180 then modifies a second access status (e.g., presence identifier 220B and/or protection identifier 230B) of the second mapping, where modifying the second access status (e.g., presence identifier 220B and/or protection identifier 230B) includes rendering the virtual machine function 183 accessible to the virtual machine 170A (block 440). In an example embodiment, the hypervisor 180 may render the virtual machine function 183 accessible to the virtual machine 170A prior to receiving the value stored in the guest device register 197A. In an example embodiment, modifying the second access status (e.g., presence identifier 220B and/or protection identifier 230B) may include marking a presence identifier 220B of the second page entry 200B 'Present'. In this manner, the VM Function 183 may be made present in the memory of the virtual machine 170A. In an example embodiment, modifying the second access status (e.g., presence identifier 220B and/or protection identifier 230B) may include marking a protection identifier 230B of the second page entry 200B 'Executable-Only'. In this manner, the virtual machine 170A may be given the ability to execute the VM Function 183 without modifying the VM Function 183. In an example embodiment, responsive to modifying the second access status (e.g., presence identifier 220B and/or protection identifier 230B), the hypervisor 180 may notify the virtual machine 170A that the VM Function 183 is accessible.

The hypervisor 180 initializes code on the virtual machine function 183 (block 450). In an example embodiment, the hypervisor 180 may initialize code on the virtual machine function 183 prior to rendering the virtual machine function 183 accessible to the virtual machine 170A. The virtual machine 170A invokes the virtual machine function 183 and accesses the memory (e.g., within page 310A) of the host device using the virtual machine function 183 (block 460).

In an example embodiment, accessing the memory (e.g., within page 310A) of the device may include providing, by the virtual machine 170A, to the virtual machine function 183 a fourth address of the guest operating system 196A, and determining, by the virtual machine 170A using the virtual machine function 183, whether the fourth address of the guest operating system 196A is within an address range of the memory (e.g., within page 310A) of the device. In an example embodiment, the fourth address of the guest operating system 196A provided by the virtual machine 170A may be an offset to the memory (e.g., within page 310A) of the device. For example, as discussed in greater detail above, the memory (e.g., within page 310A) of the device may occupy only part of the page 310A and it may be desirable to give the virtual machine 170A access to the memory (e.g., within page 310A) of the device without giving the virtual machine 170A access to the entire page 310A.

In an example embodiment, responsive to determining by the virtual machine function 183, that the fourth address of the guest operating system 196A is within the address range of the memory (e.g., within page 310A) of the device, the virtual machine function 183 provides access to the memory (e.g., within page 310A) of the device to the virtual machine 170A. For example, upon validating an offset to the memory (e.g., within page 310A) of the device provided by the virtual machine 170A by determining that the offset is within the address range of the memory (e.g., within page 310A) of the device, the virtual machine function 183 may write to or modify the contents of the memory (e.g., within page 310A) of the host device.

In another example embodiment, upon validating an offset to the memory (e.g., within page 310A) of the host device provided by the virtual machine 170A by determining that the offset is within the address range of the memory (e.g., within page 310A) of the host device, the virtual machine function 183 may read the contents of the memory (e.g., within page 310A) of the host device. For example, the virtual machine 170A may use the access to the memory (e.g., within page 310A) of the host device to transmit a message to, receive a message from, or write to the host device.

In an example embodiment, the virtual machine function 183 may calculate a fifth address of the guest operating system 196A that is within the address range of the memory (e.g., within page 310A) of the device. In an example embodiment, the virtual machine function 183 may calculate the fifth address by masking high bits greater than the size of the memory (e.g., within page 310A) of the device. For example, the virtual machine function 183 determines that the fourth address is not the correct offset of the memory (e.g., within page 310A) of the device and calculates a fifth address that is the correct offset of the memory (e.g., within page 310A) of the device. In an example embodiment, the virtual machine function 183 may then provide access to the memory (e.g., within page 310A) of the device to the virtual machine 170A as discussed in greater detail above.

In an example embodiment, accessing the memory (e.g., within page 310A) of the device using the virtual machine function 183 may include accessing the memory (e.g., within page 310A) of the device without an exit to the hypervisor 180. For example, the hypervisor 180 may not be required to set a trap to the hypervisor 180 and cause an exit to the hypervisor 180 each time the virtual machine 170A attempts to access the memory (e.g., within page 310A) of the device. Accordingly, overhead and processor utilization is reduced by facilitating access to the memory (e.g., within page 310A) of the host device without exiting.

Figure 5:
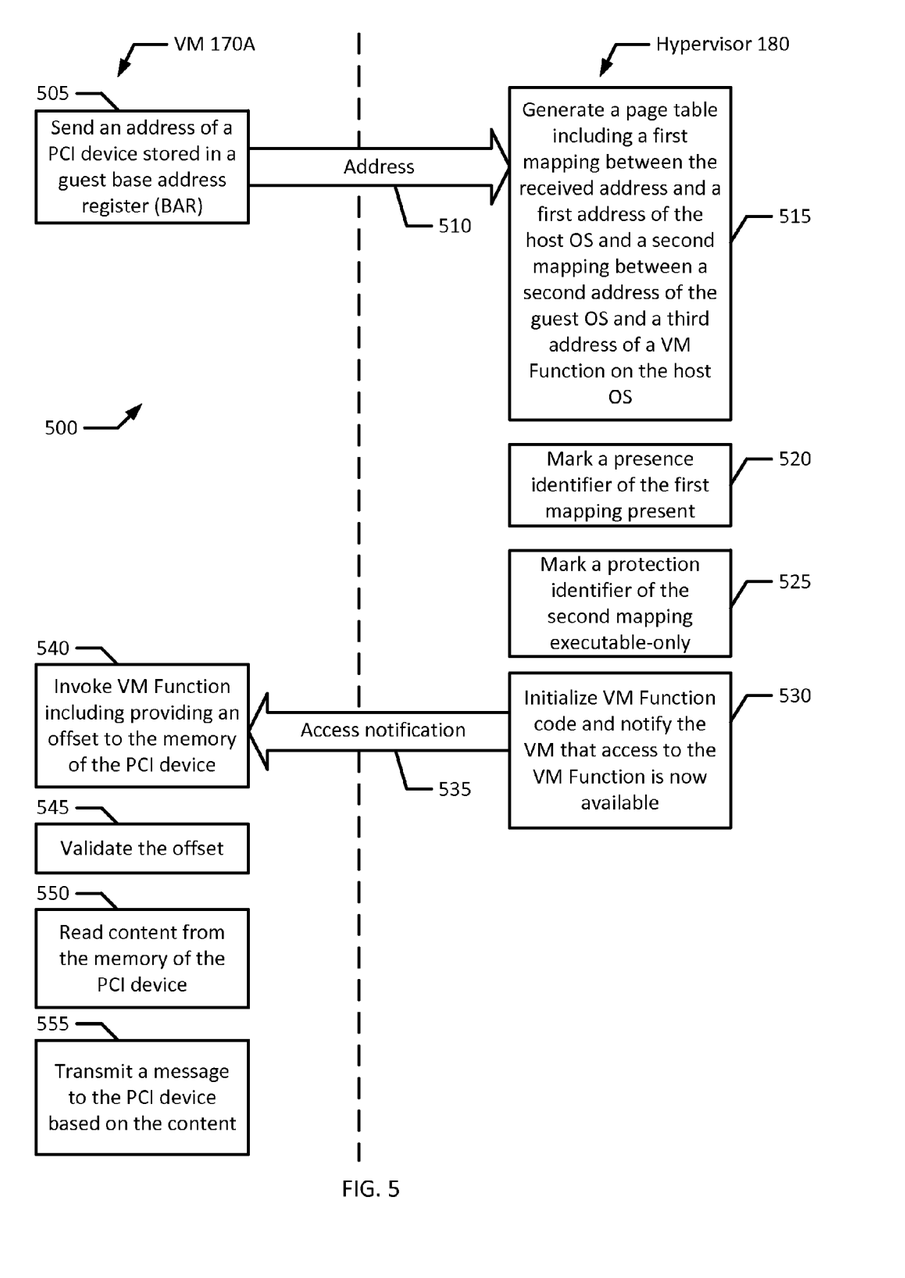
FIG. 5 is a flow diagram illustrating an example process for virtual machine function based sub-page base address register access for peripheral component interconnect device assignment according to an example embodiment of the present disclosure.

FIG. 5 illustrates a flow diagram of an example method 500 for virtual machine function based sub-page base address register access for peripheral component interconnect device assignment in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the illustrated example embodiment, a virtual machine 170A sends an address (e.g., 210A) of a PCI device (e.g., a host device) stored in a base address register (BAR) to a hypervisor 180 (blocks 505 and 510). The hypervisor 180 generates a page table 182 including a first mapping between the received address (e.g., 210A) and a first address (e.g., 240A) of the host OS 186 and a second mapping between a second address (e.g., 210B) of the guest operating system 196A and a third address (e.g., 240B) of a virtual machine function 183 on the host operating system 186 (block 515). The hypervisor 180 then marks a presence identifier 220A of the first mapping 'Present' (block 520). The hypervisor 180 marks a protection identifier 230B of the second mapping 'Executable-Only' (block 525). The hypervisor 180 initializes code on the VM Function 183 and notifies the virtual machine 170A that access to the VM Function 183 is now available (block 530). The hypervisor 180 sends this access notification to the virtual machine 170A (block 535). The virtual machine 170A then invokes the VM Function 183 and provides the VM Function 183 an offset to the memory (e.g., within page 310A) of the PCI device (e.g., a host device) (block 540). The virtual machine 170A uses the virtual machine function 183 to validate that the offset is within a proper address range of the memory (e.g., within page 310A) of the PCI device (block 545). The virtual machine 170A uses the VM Function 183 to read content from the memory (e.g., within page 310A) of the PCI device (block 550). The virtual machine 170A transmits a message to the PCI device based on the read content (block 555).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system comprising a memory, a host device, a guest device, one or more processors, in communication with the memory, a virtual machine, including a guest operating system, executing on the one or more processors, a host operating system executing on the one or more processors, and a hypervisor executing on the one or more processors to: receive, from the virtual machine, a value stored in a guest device register, responsive to receiving the value stored in the guest device register, generate, by the hypervisor, a page table including a first mapping between the value stored in the guest device register and a first address of the host operating system and a second mapping between a second address of the guest operating system and a third address of a virtual machine function on the host operating system, modify, by the hypervisor, a first access status of the first mapping, wherein modifying the first access status includes rendering memory of the host device referenced by the value stored in the guest device register accessible to the virtual machine function, modify, by the hypervisor, a second access status of the second mapping, wherein modifying the second access status includes rendering the virtual machine function accessible to the virtual machine, initialize, by the hypervisor, code on the virtual machine function to access the memory of the host device. In accordance with another example aspect of the present disclosure, which may be used in combination with any one or more of the preceding aspects, the device is a peripheral component interconnect (PCI) device. In accordance with another example aspect of the present disclosure, which may be used in combination with any one or more of the preceding aspects, the virtual machine further invokes the virtual machine function. In accordance with another example aspect of the present disclosure, which may be used in combination with any one or more of the preceding aspects, the guest device register is a base address register (BAR) of the device. In accordance with another example aspect of the present disclosure, which may be used in combination with any one or more of the preceding aspects, the value stored in the guest device register is an address of the guest device. In accordance with another example aspect of the present disclosure, which may be used in combination with any one or more of the preceding aspects, modifying the first access status includes marking a presence identifier of the first mapping present. In accordance with another example aspect of the present disclosure, which may be used in combination with any one or more of the preceding aspects, modifying the second access status includes marking a protection identifier of the second mapping executable-only. In accordance with another example aspect of the present disclosure, which may be used in combination with any one or more of the preceding aspects, accessing the memory of the host device includes initializing, by the hypervisor, code on the virtual machine function to receive, by the virtual machine function, a fourth address of the guest operating system, from the virtual machine, and determine, by the virtual machine function, whether the fourth address of the guest operating system is within an address range of the memory of the host device. In accordance with another example aspect of the present disclosure, which may be used in combination with any one or more of the preceding aspects, the fourth address of the guest operating system is an offset to the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to calculate a fifth address of the guest operating system that is within the address range of the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to calculating the fifth address of the guest operating system. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to calculating the fifth address of the guest operating system.

In a second example aspect of the present disclosure, a method, comprising receiving, from a virtual machine executing on a computer system, a value stored in a guest device register, responsive to receiving the value stored in the guest device register, generating, by a hypervisor executing on the computer system, a page table including a first mapping between the value stored in the guest device register and a first address of a host operating system and a second mapping between a second address of a guest operating system and a third address of a virtual machine function on the host operating system, modifying, by the hypervisor, a first access status of the first mapping, wherein modifying the first access status includes rendering memory of the host device referenced by the value stored in the guest device register accessible to the virtual machine function, modifying, by the hypervisor, a second access status of the second mapping, wherein modifying the second access status includes rendering the virtual machine function accessible to the virtual machine, and initializing, by the hypervisor, code on the virtual machine function to access the memory of the host device. In accordance with another example aspect of the present disclosure, which may be used in combination with any one or more of the preceding aspects, the device is a peripheral component interconnect (PCI) device. In accordance with another example aspect of the present disclosure, which may be used in combination with any one or more of the preceding aspects, the virtual machine further invokes the virtual machine function. In accordance with another example aspect of the present disclosure, which may be used in combination with any one or more of the preceding aspects, the guest device register is a base address register (BAR) of the device. In accordance with another example aspect of the present disclosure, which may be used in combination with any one or more of the preceding aspects, the value stored in the guest device register is an address of the guest device. In accordance with another example aspect of the present disclosure, which may be used in combination with any one or more of the preceding aspects, modifying the first access status includes marking a presence identifier of the first mapping present. In accordance with another example aspect of the present disclosure, which may be used in combination with any one or more of the preceding aspects, modifying the second access status includes marking a protection identifier of the second mapping executable-only. In accordance with another example aspect of the present disclosure, which may be used in combination with any one or more of the preceding aspects, accessing the memory of the host device includes initializing, by the hypervisor, code on the virtual machine function to receive, by the virtual machine function, a fourth address of the guest operating system, from the virtual machine, and determine, by the virtual machine function, whether the fourth address of the guest operating system is within an address range of the memory of the host device. In accordance with another example aspect of the present disclosure, which may be used in combination with any one or more of the preceding aspects, the fourth address of the guest operating system is an offset to the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to calculate a fifth address of the guest operating system that is within the address range of the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to calculating the fifth address of the guest operating system. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to calculating the fifth address of the guest operating system.

In a third example aspect of the present disclosure, a computer-readable non-transitory storage medium comprising executable instructions that, when executed by a computer system, cause the computer system to receive, from a virtual machine executing on the computer system, a value stored in a guest device register, responsive to receiving the value stored in the guest device register, generate, by a hypervisor executing on the computer system, a page table including a first mapping between the value stored in the guest device register and a first address of a host operating system and a second mapping between a second address of a guest operating system and a third address of a virtual machine function on the host operating system, modify, by the hypervisor, a first access status of the first mapping, wherein modifying the first access status includes rendering memory of the host device referenced by the value stored in the guest device register accessible to the virtual machine function, modify, by the hypervisor, a second access status of the second mapping, wherein modifying the second access status includes rendering the virtual machine function accessible to the virtual machine, and initialize, by the hypervisor, code on the virtual machine function to access the memory of the host device. In accordance with another example aspect of the present disclosure, which may be used in combination with any one or more of the preceding aspects, the device is a peripheral component interconnect (PCI) device. In accordance with another example aspect of the present disclosure, which may be used in combination with any one or more of the preceding aspects, the virtual machine further invokes the virtual machine function. In accordance with another example aspect of the present disclosure, which may be used in combination with any one or more of the preceding aspects, the guest device register is a base address register (BAR) of the device. In accordance with another example aspect of the present disclosure, which may be used in combination with any one or more of the preceding aspects, the value stored in the guest device register is an address of the guest device. In accordance with another example aspect of the present disclosure, which may be used in combination with any one or more of the preceding aspects, modifying the first access status includes marking a presence identifier of the first mapping present. In accordance with another example aspect of the present disclosure, which may be used in combination with any one or more of the preceding aspects, modifying the second access status includes marking a protection identifier of the second mapping executable-only. In accordance with another example aspect of the present disclosure, which may be used in combination with any one or more of the preceding aspects, accessing the memory of the host device includes initializing, by the hypervisor, code on the virtual machine function to receive, by the virtual machine function, a fourth address of the guest operating system, from the virtual machine, and determine, by the virtual machine function, whether the fourth address of the guest operating system is within an address range of the memory of the host device. In accordance with another example aspect of the present disclosure, which may be used in combination with any one or more of the preceding aspects, the fourth address of the guest operating system is an offset to the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to determining that the fourth address of the guest operating system is within the address range of the memory of the host device. In accordance with another example aspect of the present disclosure, which may be used in combination with any one or more of the preceding aspects, accessing the memory of the host device further includes initializing, by the hypervisor, code on the virtual machine function to calculate a fifth address of the guest operating system that is within the address range of the memory of the host device. In accordance with another example aspect of the present disclosure, which may be used in combination with any one or more of the preceding aspects, accessing the memory of the host device further includes initializing, by the hypervisor, code on the virtual machine function to read, by the virtual machine function, content in the memory of the host device responsive to calculating the fifth address of the guest operating system. In accordance with another example aspect of the present disclosure, which may be used in combination with any one or more of the preceding aspects, accessing the memory of the host device further includes initializing, by the hypervisor, code on the virtual machine function to modify, by the virtual machine function, content in the memory of the host device responsive to calculating the fifth address of the guest operating system.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
    a memory;
    a host device;
    a guest device;
    one or more processors, in communication with the memory;
    a virtual machine, including a guest operating system, executing on the one or more processors;
    a host operating system executing on the one or more processors; and
    a hypervisor executing on the one or more processors to:
    receive, from the virtual machine, a value stored in a guest device register;
    responsive to receiving the value stored in the guest device register, generate, by the hypervisor, a page table including a first mapping between the value stored in the guest device register and a first address of the host operating system and a second mapping between a second address of the host operating system and a third address of a virtual machine function on the host operating system;
    modify, by the hypervisor, a first access status of the first mapping, wherein modifying the first access status includes rendering memory of the host device referenced by the value stored in the guest device register accessible to the virtual machine function;
    modify, by the hypervisor, a second access status of the second mapping, wherein modifying the second access status includes rendering the virtual machine function accessible to the virtual machine; and
    initialize, by the hypervisor, code on the virtual machine function to access the memory of the host device.

2. The system of claim 1, wherein the guest device is a peripheral component interconnect (PCI) device.

3. The system of claim 1, wherein the virtual machine further invokes the virtual machine function.

4. The system of claim 1, wherein the guest device register is a base address register (BAR) of the guest device.

5. The system of claim 1, wherein the value stored in the guest device register is an address of the guest device.

6. The system of claim 1, wherein modifying the first access status includes marking a presence identifier of the first mapping present.

7. The system of claim 1, wherein modifying the second access status includes marking a protection identifier of the second mapping executable-only.

8. The system of claim 1, wherein accessing the memory of the host device includes initializing, by the hypervisor, code on the virtual machine function to receive, by the virtual machine function, a fourth address of the guest operating system, from the virtual machine, and determine, by the virtual machine function, whether the fourth address of the guest operating system is within an address range of the memory of the host device.

9. The system of claim 8, wherein the fourth address of the guest operating system is an offset to the memory of the host device.

10. The system of claim 8, wherein accessing the memory of the host device further includes initializing, by the hypervisor, code on the virtual machine function to read, by the virtual machine function, content in the memory of the host device responsive to determining that the fourth address of the guest operating system is within the address range of the memory of the host device.

11. The system of claim 8, wherein accessing the memory of the host device further includes initializing, by the hypervisor, code on the virtual machine function to modify, by the virtual machine function, content in the memory of the host device responsive to determining that the fourth address of the guest operating system is within the address range of the memory of the host device.

12. The system of claim 1, wherein accessing the memory of the host device further includes initializing, by the hypervisor, code on the virtual machine function to calculate a fifth address of the guest operating system that is within the address range of the memory of the host device.

13. The system of claim 12, wherein accessing the memory of the memory of the host device further includes initializing, by the hypervisor, code on the virtual machine function to read, by the virtual machine function, content of the memory of the host device responsive to calculating the fifth address of the guest operating system.

14. The system of claim 12, wherein accessing the memory of the memory of the host device further includes initializing, by the hypervisor, code on the virtual machine function to modify, by the virtual machine function, content of the memory of the host device responsive to calculating the fifth address of the guest operating system.

15. A method, comprising:
receiving, from a virtual machine executing on a computer system, a value stored in a guest device register;
responsive to receiving the value stored in the guest device register, generating, by a hypervisor executing on the computer system, a page table including a first mapping between the value stored in the guest device register and a first address of a host operating system and a second mapping between a second address of a guest operating system and a third address of a virtual machine function on the host operating system;
modifying, by the hypervisor, a first access status of the first mapping, wherein modifying the first access status includes rendering memory of the host device referenced by the value stored in the guest device register accessible to the virtual machine function;
modifying, by the hypervisor, a second access status of the second mapping, wherein modifying the second access status includes rendering the virtual machine function accessible to the virtual machine; and
initializing, by the hypervisor, code on the virtual machine function to access the memory of the host device.

16. The method of claim 15, wherein accessing the memory of the host device includes initializing, by the hypervisor, code on the virtual machine function to receive, by the virtual machine function, a fourth address of the guest operating system, from the virtual machine, and determine, by the virtual machine function, whether the fourth address of the guest operating system is within an address range of the memory of the host device.

17. The method of claim 16, wherein accessing the memory of the host device further includes initializing, by the hypervisor, code on the virtual machine function to read, by the virtual machine function, content in the memory of the host device responsive to determining that the fourth address of the guest operating system is within the address range of the memory of the host device.

18. The method of claim 15, wherein accessing the memory of the host device further includes initializing, by the hypervisor, code on the virtual machine function to calculate a fifth address of the guest operating system that is within the address range of the memory of the host device.

19. A computer-readable non-transitory storage medium comprising executable instructions that, when executed by a computer system, cause the computer system to:
receive, from a virtual machine executing on the computer system, a value stored in a guest device register;
responsive to receiving the value stored in the guest device register, generate, by a hypervisor executing on the computer system, a page table including a first mapping between the value stored in the guest device register and a first address of a host operating system and a second mapping between a second address of a guest operating system and a third address of a virtual machine function on the host operating system;
modify, by the hypervisor, a first access status of the first mapping, wherein modifying the first access status includes rendering memory of the host device referenced by the value stored in the guest device register accessible to the virtual machine function;
modify, by the hypervisor, a second access status of the second mapping, wherein modifying the second access status includes rendering the virtual machine function accessible to the virtual machine; and
initialize, by the hypervisor, code on the virtual machine function to access the memory of the host device.

20. The computer-readable non-transitory storage medium of claim 19, wherein accessing the memory of the host device further includes initializing, by the hypervisor, code on the virtual machine function to calculate a fifth address of the guest operating system that is within the address range of the memory of the host device.

* * * * *